US011478916B2

(12) United States Patent
Murakami et al.

(10) Patent No.: US 11,478,916 B2
(45) Date of Patent: Oct. 25, 2022

(54) ELECTRIC POWER TOOL

(71) Applicant: Panasonic Intellectual Property Management Co., Ltd., Osaka (JP)

(72) Inventors: Hiroaki Murakami, Kyoto (JP); Akiko Honda, Osaka (JP); Mitsumasa Mizuno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 428 days.

(21) Appl. No.: 16/617,494

(22) PCT Filed: Mar. 14, 2018

(86) PCT No.: PCT/JP2018/009893
§ 371 (c)(1),
(2) Date: Nov. 26, 2019

(87) PCT Pub. No.: WO2018/220941
PCT Pub. Date: Dec. 6, 2018

(65) Prior Publication Data
US 2020/0180131 A1 Jun. 11, 2020

(30) Foreign Application Priority Data

May 30, 2017 (JP) .............................. JP2017-107098

(51) Int. Cl.
*B25F 5/00* (2006.01)
*H02K 7/14* (2006.01)
(52) U.S. Cl.
CPC ............... *B25F 5/00* (2013.01); *H02K 7/145* (2013.01)

(58) Field of Classification Search
CPC ........................................................ B25F 5/00
(Continued)

(56) References Cited

U.S. PATENT DOCUMENTS 3,938,595 A * 2/1976 Swenson ................... E02D 7/08
254/269
4,316,512 A * 2/1982 Kibblewhite ....... B25B 23/1453
173/183

(Continued)

FOREIGN PATENT DOCUMENTS

JP H02-101946 A 4/1990
JP 2006-972 A 1/2006

(Continued)

OTHER PUBLICATIONS

European Office Action issued in corresponding European Patent Application No. 18810556.3, dated Dec. 22, 2021.

(Continued)

*Primary Examiner* — Michelle Lopez
(74) *Attorney, Agent, or Firm* — McDermott Will & Emery LLP

(57) ABSTRACT

An electric power tool includes: a motor unit including a motor; a driving block for transmitting a rotational output of the motor to a front-end tool; and a rotation detector that detects an angle of rotation of the motor. The rotation detector includes a rotating body attached to a motor shaft and a position detector that outputs a rotational position signal corresponding to a rotational position of the rotating body. The rotating body includes an opening, and the motor shaft is press fitted and fixed to the opening of the rotating body.

6 Claims, 6 Drawing Sheets

(58) Field of Classification Search
USPC .......................................................... 173/183
See application file for complete search history.

(56) References Cited

U.S. PATENT DOCUMENTS

| | | | | |
|---|---|---|---|---|
| 8,198,839 B2 * | 6/2012 | Katou | ..................... | B25F 5/02 388/937 |
| 2010/0001719 A1 | 1/2010 | Kikuchi et al. | | |
| 2016/0336838 A1 | 11/2016 | Kouda et al. | | |

FOREIGN PATENT DOCUMENTS

| | | | |
|---|---|---|---|
| JP | 2007-136607 A | 6/2007 |
| JP | 2010-35411 A | 2/2010 |
| JP | 2012-71360 A | 4/2012 |
| JP | 2016-221632 A | 12/2016 |
| JP | 2017-009312 A | 1/2017 |

OTHER PUBLICATIONS

Extended European Search Report issued in corresponding European Patent Application No. 18810556.3, dated May 7, 2020.
International Search Report issued in corresponding International Patent Application No. PCT/JP2018/009893, dated Apr. 24, 2018, with English translation.

* cited by examiner

ELECTRIC POWER TOOL

CROSS-REFERENCE TO RELATED APPLICATIONS

This application is the U.S. National Phase under 35 U.S.C. § 371 of International Patent Application No. PCT/JP2018/009893, filed on Mar. 14, 2018, which in turn claims the benefit of Japanese Patent Application No. 2017-107098, filed on May 30, 2017, the entire disclosures of which Applications are incorporated by reference herein.

TECHNICAL FIELD

The present disclosure relates to an electric power tool including a rotation detector for detecting the angle of rotation of a motor.

BACKGROUND ART

It is common to use a built-in motor in a hand-held electric power tool used to bore a hole or to tighten a screw, etc. to reduce the size and weight (e.g., patent literatures 1-3). A built-in motor is configured by assembling the constituting elements of the motor directly in a rib member provided to project from the inner circumferential surface of the housing.

Patent Literature

[Patent Literature 1] JP2007-136607
[Patent Literature 2] JP2006-972
[Patent Literature 3] JP2012-71360

SUMMARY OF INVENTION

Technical Problem

In electric power tools such as a rotary impact tool, control for estimating the tightening torque from the angle of rotation of the motor is exercised. To increase the precision of estimating the tightening torque, a rotation detector for detecting the angle of rotation of the motor with a high precision needs to be provided in the electric power tool.

The disclosure addresses the above-described issue, and a general purpose thereof is to provide a technology of efficiently providing a rotation detector in an electric power tool.

Solution to Problem

An electric power tool according to an embodiment of the present disclosure includes: a motor; a transmission mechanism that transmits a rotational output of the motor to a front-end tool; and a rotation detector that detects an angle of rotation of the motor, wherein the rotation detector includes a rotating body attached to a motor shaft of the motor and a position detector that outputs a rotational position signal corresponding to a rotational position of the rotating body. The rotating body includes an opening, and the motor shaft is press fitted and fixed to the opening of the rotating body.

DESCRIPTION OF EMBODIMENTS

Figure 1:
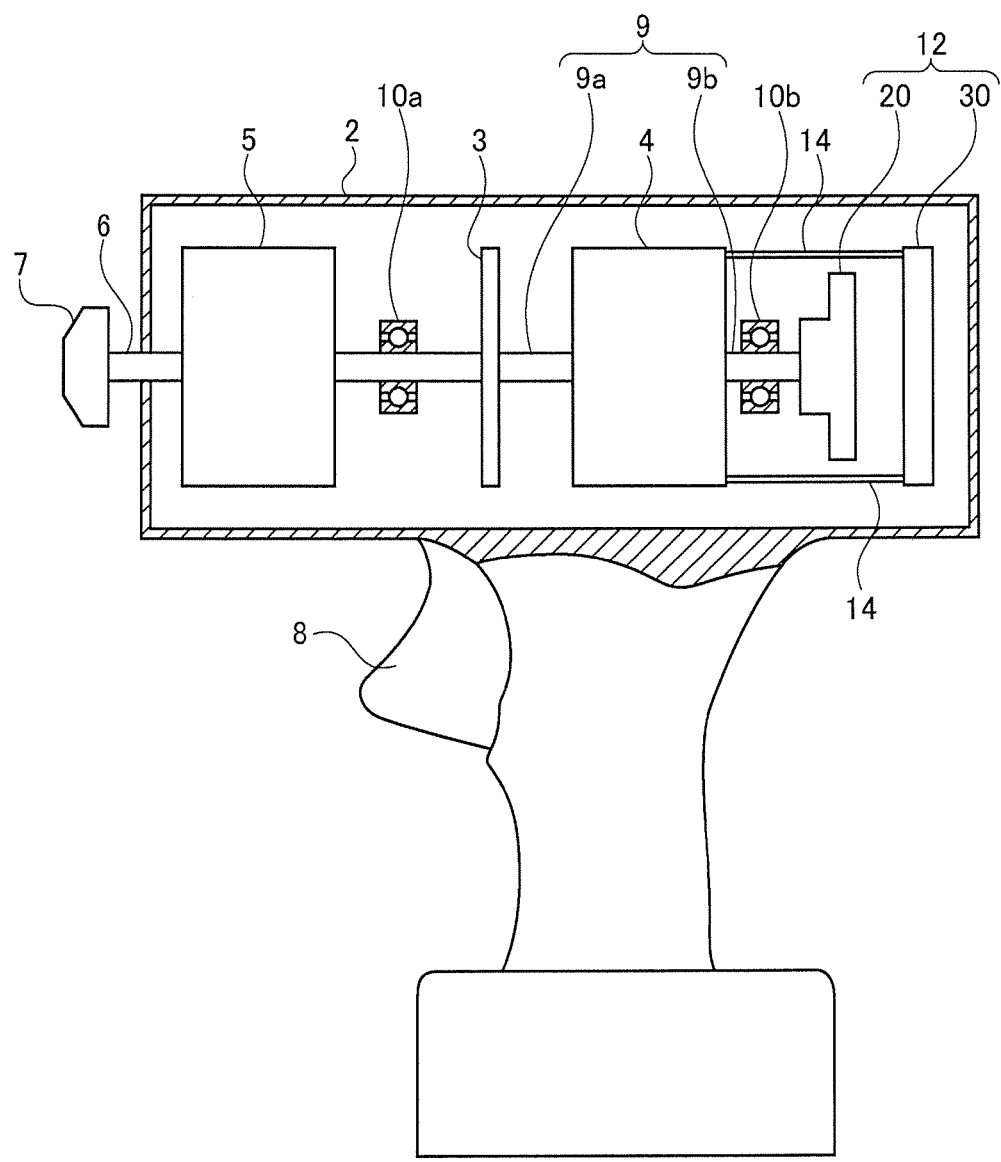
FIG. 1 is a schematic cross-sectional view of a part of an electric power tool according to an embodiment.

FIG. 1 is a schematic cross-sectional view of a part of an electric power tool according to an embodiment of the present disclosure. An electric power tool 1 includes a housing 2, and a motor unit 4 is built in the housing 2. The motor unit 4 is configured as a built-in motor that functions by building a stator and a rotor, integrated with a motor shaft 9, in the housing 2. The absence of a motor case contributes to the compact size and light weight of the electric power tool 1. The motor shaft 9 in front of the motor unit 4 will be referred to as "a motor shaft 9a" and the motor shaft behind will be referred to as "a motor shaft 9b". A cooling fan 3 (centrifugal fan) is fixed to the motor shaft 9a.

A driving block 5 includes a transmission mechanism for transmitting a rotational output of the motor to a front-end tool. More specifically, the driving block 5 may include a power transmission mechanism for transmitting the rotational output of the motor shaft 9a to an output shaft 6. The power transmission mechanism may include a planetary gear deceleration mechanism in mesh with a pinion gear attached to the motor shaft 9a. In the case the electric power tool 1 is a rotary impact tool, the power transmission mechanism includes an impact mechanism for generating an intermittent rotary impact force in the output shaft 6. A chuck mechanism 7 is coupled to the output shaft 6. A front-end tool such as a drill and a driver is removably attached to the chuck mechanism 7. A user operation switch 8 controlled by an operator is provided in a grip of the housing 2. When the operator pulls the user operation switch 8, the rotor in the motor unit 4 is rotated so that the output shaft 6 drives the front-end tool.

The motor unit 4 is a brushless motor of an inner rotor type. The rotor including a plurality of permanent magnets is rotated in a space inward of a stator. The rotor and the stator that constitute the motor unit 4 are fixed separately and independently to the housing 2. The housing 2 is comprised of a pair of (left and right) half housing members sandwiching a perpendicular plane that crosses the line of rotational axis at the center of the electric power tool 1. The motor unit 4 is assembled in the housing 2 by building the stator and first and second bearings 10a, 10b for the motor shaft 9 into one of the housing members, aligning the other housing member with the assembly, and joining the pair of housing members by, for example, tightening a screw.

A rotation detector 12 for detecting the angle of rotation of the motor is provided behind the motor unit 4. The rotation detector 12 includes a rotating body 20 attached to the motor shaft 9b and a position detector 30 for outputting a rotational position signal corresponding to the rotational position of the rotating body 20. The position detector 30 is a sensor provided on a sensor substrate. The rotation detector 12 may be a magnetic encoder or an optical encoder.

In the case the rotation detector 12 is a magnetic encoder, the rotating body 20 includes a magnet, and the position detector 30 includes a magnetic sensor for detecting variation in magnetic force. To increase the precision of detecting the angle of motor rotation, the gap between the rotating body 20 and the position detector 30 is configured to be small. For example, the gap is about 2 mm. In the case the rotation detector 12 is an optical encoder, the rotating body 20 is a rotating disc formed with a slit that shields/transmits light. The position detector 30 includes a light receiving device such as a photodiode. The rotation detector 12 may be an encoder of a desired type, and the position detector 30 outputs a rotational position signal corresponding to the rotational position of the rotating body 20 to a controller (not shown) for controlling the motor rotation.

The position detector 30 is fixed by a supporting member 14 to the motor unit 4 on the side of (toward) the stator. By fixing the rotating body 20 to the motor shaft 9b and fixing the position detector 30 to the motor unit 4, the precision of assembly of the rotating body 20 and the position detector 30 is increased, and the gap between the rotating body 20 and the position detector 30 is set to a predetermined value with a high precision. As compared with the case of fixing the position detector 30 to the housing 2, fixing of the position detector 30 to the motor unit 4 makes the relative positions of the rotating body 20 and the position detector 30 less affected by the deformation of the housing 2 so that the highly reliable rotation detector 12 is implemented.

Figure 2:
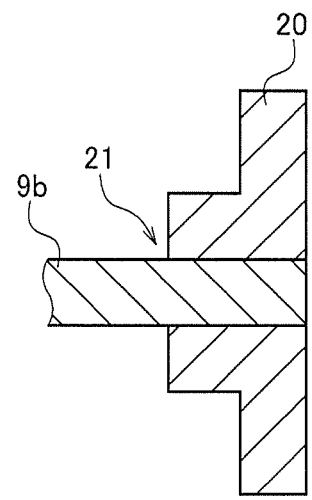
FIG. 2 shows a cross section of the rotating body and the motor shaft.

FIG. 2 shows a cross section of the rotating body 20 and the motor shaft 9b. The rotating body 20 includes an opening 21, and the motor shaft 9b is press fitted and fixed in the opening 21 of the rotating body 20. By press fitting and fixing the motor shaft 9b in the opening 21, not only the assembly process is made easier but also the number of components and the size are reduced as compared with the case of fixing the motor shaft 9b and the rotating body 20 by tightening a screw.

Referring to FIG. 1, the rotating body 20 is attached to the motor shaft 9b at a position in which the rotating body 20 is not in contact with the second bearing 10b supporting the motor shaft 9b. The second bearing 10b is already press fitted and fixed to the motor shaft 9b before the rotating body 20 is attached to the motor shaft 9b. The rotating body 20 is attached to the motor shaft 9b by being pushed to its position while the opening 21 is arranged to be coaxial with the motor shaft 9b. The rotating body 20 is designed such that it cannot be pushed as far as the position where the second bearing 10b is press fitted. For this reason, the position where the second bearing 10b is press fitted is not shifted as a result of pushing the rotating body 20.

Figure 3A:
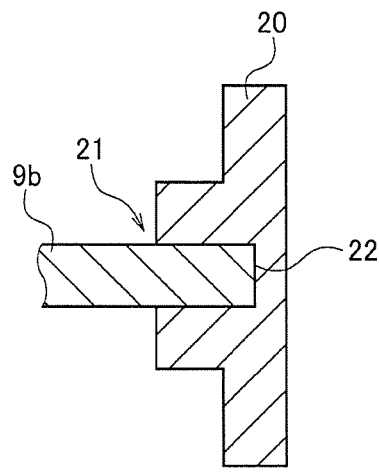
FIGS. 3A-3C show examples of the press fitting restriction part.
Figure 3B:
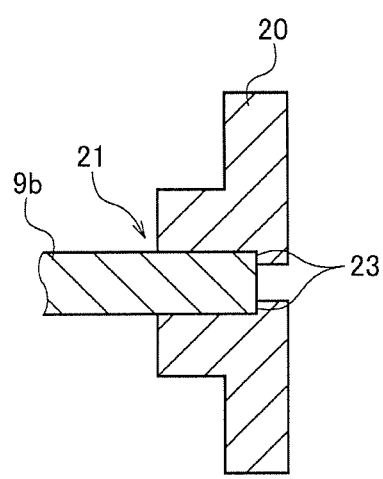
Figure 3C:
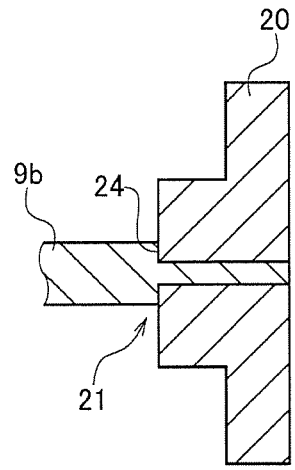

To further facilitate the assembly process of the rotating body 20, a press fitting restriction part that restricts the depth of press fitting the motor shaft 9b may be provided in at least one of the motor shaft 9b and the opening 21. By using the press fitting restriction part, the rotating body 20 is positioned easily with respect to the motor shaft 9b. FIGS. 3A-3C show examples of the press fitting restriction part.

FIG. 3A shows a press fitting restriction part 22 embodied by the bottom of the opening 21 of the rotating body 20. In the example shown in FIG. 3A, the opening 21 is formed to have a bottom, and the rotating body 20 is attached to the motor shaft 9b by press fitting the motor shaft 9b in the opening 21 until the motor shaft 9b comes into contact with the press fitting restriction part 22.

FIG. 3B shows a press fitting restriction part 23 embodied by a step formed in the opening 21 of the rotating body 20. In the example shown in FIG. 3B, a small-diameter part is formed in the opening 21, and the rotating body 20 is attached to the motor shaft 9b by press fitting the motor shaft 9b in the opening 21 until the motor shaft 9b comes into contact with the press fitting restriction part 23.

FIG. 3C shows a press fitting restriction part 24 embodied by a step formed in the motor shaft 9b. In the example shown in FIG. 3C, the rotating body 20 is attached to the motor shaft 9b by press fitting the motor shaft 9b in the opening 21 until the press fitting restriction part 24 comes into contact with the end face of the opening 21 of the rotating body 20.

Figure 4A:
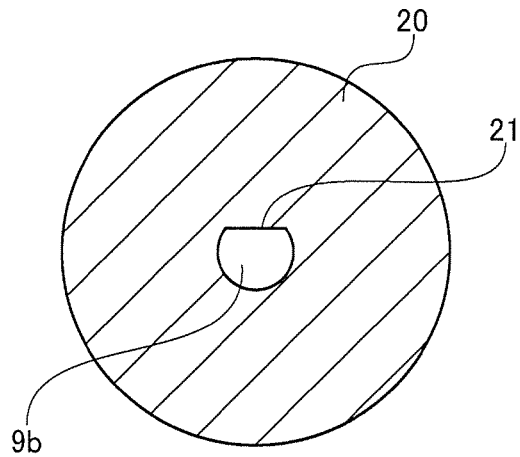
FIGS. 4A-4B show examples of the rotation stopper mechanism.
Figure 4B:
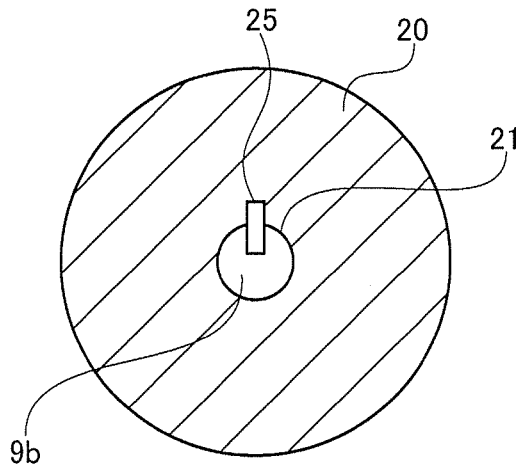

In order for the rotation detector 12 to detect the angle of rotation of the motor with a high precision, it is necessary to attach the rotating body 20 to the motor shaft 9b such that the relative rotation is disabled. For this reason, the rotating body 20 is fixed to the motor shaft 9b via a rotation stopper structure. FIGS. 4A-4C show examples of the rotation stopper mechanism.

FIG. 4A shows a rotation stopper structure in which the cross section of the opening 21 of the rotating body 20 has a shape of letter D, and the cross section of the end of the motor shaft 9b has a shape of letter D. Relative rotation of the rotating body 20 and the motor shaft 9b is prohibited by press fitting the motor shaft 9b having a D-shaped cross section in the opening 21.

FIG. 4B shows a rotation stopper structure in which key grooves are formed in the opening 21 and the motor shaft 9b, and a rotation prohibition member 25 embodying a key is inserted into the both key grooves. Relative rotation of the rotating body 20 and the motor shaft 9b is prohibited by placing the rotation prohibition member 25 in the key grooves in the opening 21 and in the motor shaft 9b.

Figure 5:
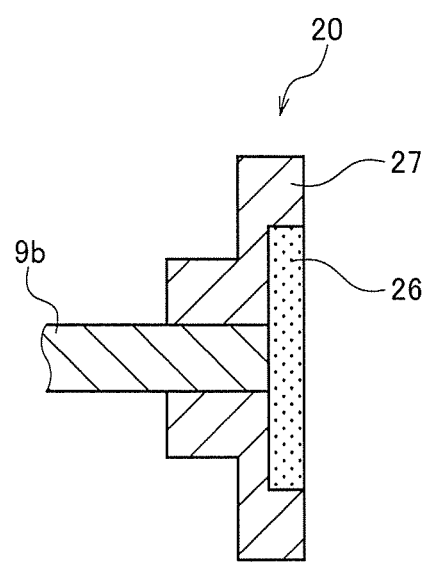
FIG. 5 shows an example of the rotating body.

FIG. 5 shows an example of the rotating body 20. The rotating body 20 constitutes a component in the magnetic encoder and includes a magnet 26 and a fixing bush 27 for fixing the magnet 26. A recess for fitting the magnet 26 is formed on the fixing surface of the fixing bush 27, and the magnet 26 is fixed by being fitted in the recess. It is preferred that the magnet 26 be adhesively fixed in the recess of the bush fixing surface. This secures the magnet 26 in the fixing bush 27 properly.

Figure 6A:
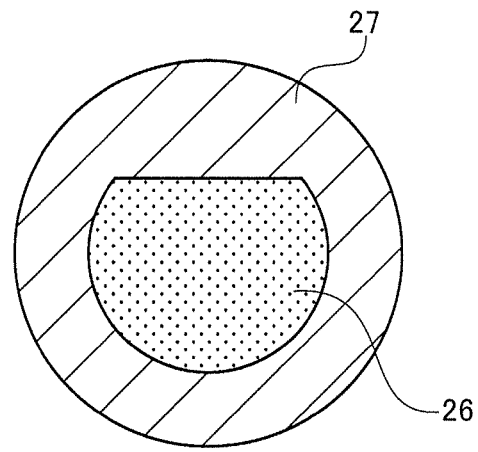
FIG. 6A-6B show examples of the recess formed in the fixing surface.
Figure 6B:
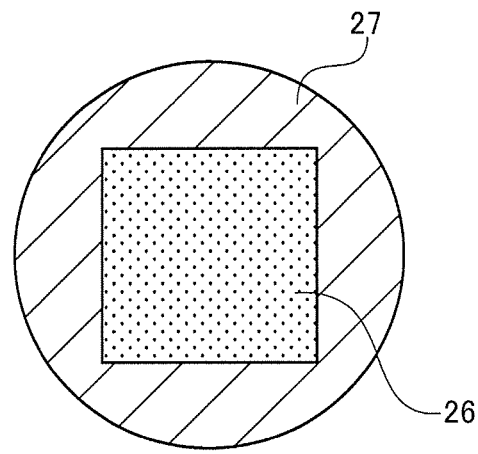

It is preferred that the magnet 26 have a shape fitted in the recess of the fixing bush 27 in such a manner that relative rotation is disabled and that the magnet 26 be fitted in the recess in such a manner that relative rotation is disabled. FIG. 6A shows an example in which the recess of the fixing surface of the fixing bush 27 has a shape of letter D. The magnet 26 has a shape of letter D fitted to the recess. The magnet 26 is fitted in the recess and fixed by an adhesive. FIG. 6B shows an example in which the recess of the fixing surface of the fixing bush 27 has a shape of a square. The magnet 26 has a shape of a square fitted to the recess. The magnet 26 is fitted in the recess and fixed by an adhesive.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

One embodiment of the present invention is summarized below. An electric power tool (1) according to an embodiment of the present disclosure includes: a motor (4); a transmission mechanism (5) that transmits a rotational output of the motor to a front-end tool; and a rotation detector (12) that detects an angle of rotation of the motor. The rotation detector (12) includes a rotating body (20) attached to a motor shaft (9b) of the motor and a position detector (30) that outputs a rotational position signal corresponding to a rotational position of the rotating body, the rotating body (20) includes an opening (21), and the motor shaft (9b) is press fitted and fixed to the opening of the rotating body.

A press fitting restriction part (22, 23, 24) that restricts a depth of press fitting of the motor shaft is preferably provided in at least one of the motor shaft (9*b*) and the opening (21). The rotating body (20) is preferably attached to the motor shaft (9*b*) in such a manner that relative rotation is disabled.

The rotation detector (12) may be a magnetic encoder, and the rotating body (20) may include a magnet (26) and a fixing bush (27) for fixing the magnet. The magnet (26) may be adhesively fixed to the fixing bush (27). The fixing bush (27) may include a recess on a fixing surface for fixing the magnet, and the magnet may have a shape fitted in the recess of the fixing bush in such a manner that relative rotation is disabled. The rotating body (20) is preferably attached to the motor shaft at a position in which the rotating body (20) is not in contact with a bearing (10*b*) that supports the motor shaft (9*b*).

REFERENCE SIGNS LIST

1 . . . electric power tool, 2 . . . housing, 4 . . . motor unit, 5 . . . driving block, 6 . . . output shaft, 9*a*, 9*b* . . . motor shaft, 10*a* . . . first bearing, 10*b* . . . second bearing, 12 . . . rotation detector, 20 . . . rotating body, 21 . . . opening, 22, 23, 24 . . . press-fit restriction part, 25 . . . rotation stopper, 26 . . . magnet, 27 . . . fixing bush, 30 . . . position detector

INDUSTRIAL APPLICABILITY

The present invention can be used in the field of electric power tools.

The invention claimed is:

1. An electric power tool comprising:
   a motor;
   a transmission mechanism that transmits a rotational output of the motor to a front-end tool; and
   a rotation detector that detects an angle of rotation of the motor, wherein
      the rotation detector includes a rotating body attached to a motor shaft of the motor and a position detector that outputs a rotational position signal corresponding to a rotational position of the rotating body,
      the rotating body includes an opening, and the motor shaft is press fitted and fixed to the opening of the rotating body, and
      a press fitting restriction part that restricts a depth of press fitting of the motor shaft is provided in at least one of the motor shaft and the opening, wherein the press fitting restriction part includes a rear facing end face of the motor shaft that faces the position detector, and the rear facing end face contacts a front facing end face of the rotating body.

2. The electric power tool according to claim 1, wherein the rotating body is attached to the motor shaft in such a manner that relative rotation is disabled.

3. The electric power tool according to claim 1, wherein the rotation detector is a magnetic encoder, and the rotating body includes a magnet and a fixing bush for fixing the magnet.

4. The electric power tool according to claim 3, wherein the magnet is adhesively fixed to the fixing bush.

5. The electric power tool according to claim 3, wherein the fixing bush includes a recess on a fixing surface for fixing the magnet, and the magnet has a shape fitted in the recess of the fixing bush in such a manner that relative rotation is disabled.

6. The electric power tool according to claim 1, wherein the rotating body is attached to the motor shaft at a position in which the rotating body is not in contact with a bearing that supports the motor shaft.

* * * * *